United States Patent
Ishida et al.

(10) Patent No.: US 9,924,294 B2
(45) Date of Patent: Mar. 20, 2018

(54) METHOD, APPARATUS AND SYSTEM FOR COMMUNICATION

(71) Applicant: SONY CORPORATION, Tokyo (JP)

(72) Inventors: Akihiro Ishida, Tokyo (JP); Tomonori Sueda, Tokyo (JP); Susumu Takatsuka, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 15/055,228

(22) Filed: Feb. 26, 2016

(65) Prior Publication Data
US 2016/0255457 A1    Sep. 1, 2016

Related U.S. Application Data

(60) Provisional application No. 62/126,248, filed on Feb. 27, 2015.

(51) Int. Cl.
*G05B 19/02* (2006.01)
*H04W 4/00* (2018.01)
*H04B 5/00* (2006.01)

(52) U.S. Cl.
CPC .......... *H04W 4/003* (2013.01); *H04B 5/0056* (2013.01); *H04W 4/008* (2013.01)

(58) Field of Classification Search
CPC ...................................................... H04B 1/205
USPC ..................... 340/4.3, 4.31–4.33, 4.35, 4.37
See application file for complete search history.

(56) References Cited

U.S. PATENT DOCUMENTS

| | | | |
|---|---|---|---|
| 7,072,945 B1* | 7/2006 | Nieminen | G08C 17/02 455/41.2 |
| 8,244,917 B2 | 8/2012 | Takayama et al. | |
| 9,655,215 B1* | 5/2017 | Ho | H05B 37/0272 |
| 2002/0007238 A1* | 1/2002 | Moriguchi | H04L 29/06 701/36 |
| 2013/0057591 A1* | 3/2013 | Sugiyama | H04W 48/20 345/671 |
| 2013/0085887 A1* | 4/2013 | Zhang | G06Q 40/00 705/26.8 |
| 2013/0108071 A1* | 5/2013 | Huang | H04W 4/008 381/77 |
| 2013/0171981 A1* | 7/2013 | Woo | G08C 17/02 455/420 |

(Continued)

*Primary Examiner* — Carlos E Garcia
(74) *Attorney, Agent, or Firm* — Oblon, McClelland, Maier & Neustadt, L.L.P.

(57) ABSTRACT

Aspects of the disclosure provide a first device including a storage, a first communication circuit, and a controller. The storage is re-writable. The first communication circuit is configured to perform first wireless communication with other devices when the other devices are within a first distance to the first device. The controller is configured to write first information in a specific memory space of the storage in response to a trigger operation of a user. The first information is transmitted to a second device by the first communication circuit when the second device is within the first distance to the first device for a first time. The controller is further configured to write second information in the specific memory space of the storage. The second information is transmitted by the first communication circuit to one or more other devices at following times.

20 Claims, 9 Drawing Sheets

(56) References Cited

U.S. PATENT DOCUMENTS

| | | | |
|---|---|---|---|
| 2014/0075514 A1* | 3/2014 | Prasad | G06F 21/78 726/4 |
| 2014/0300490 A1* | 10/2014 | Kotz | A61B 5/0028 340/870.3 |
| 2015/0116933 A1* | 4/2015 | Kim | G06F 1/1613 361/679.55 |
| 2015/0119019 A1* | 4/2015 | Minichmayr | G07C 9/00571 455/420 |
| 2017/0019525 A1* | 1/2017 | Hannon | H04M 1/72577 |

* cited by examiner

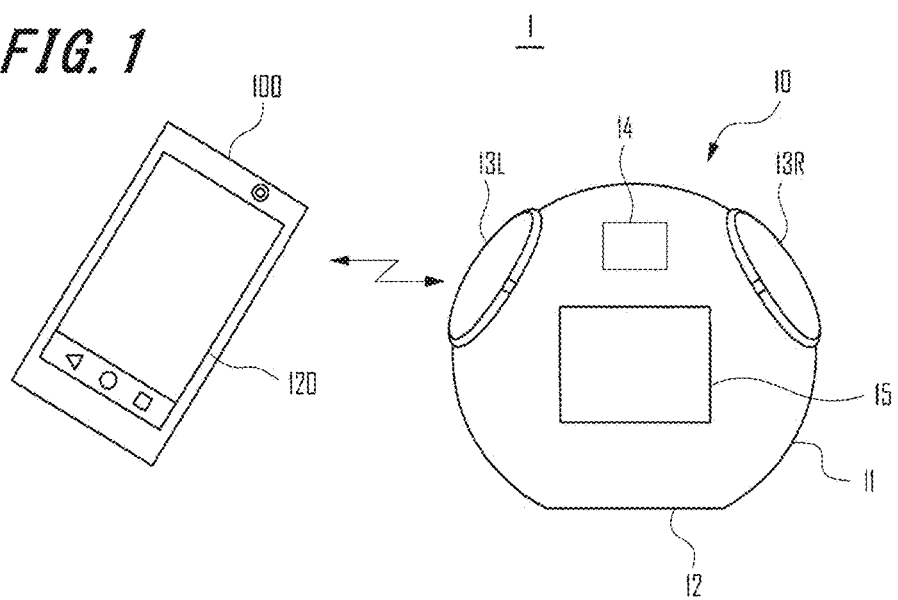
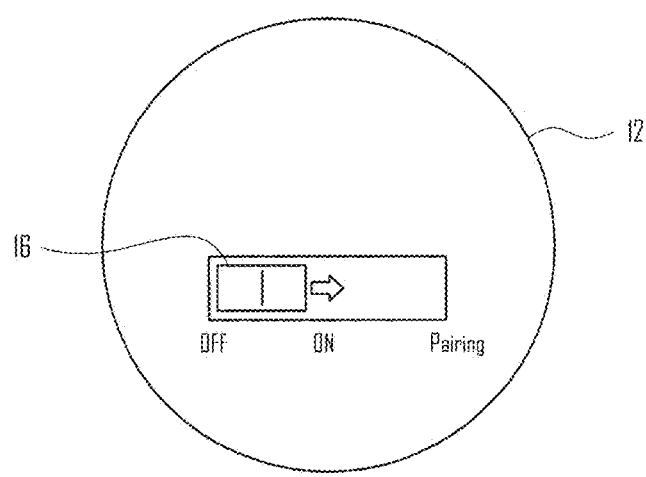

METHOD, APPARATUS AND SYSTEM FOR COMMUNICATION

INCORPORATION BY REFERENCE

This present disclosure claims the benefit of U.S. Provisional Application No. 62/126,248, "THE WAY TO SUPPORT BOTH ONE-TOUCH INITIAL SETUP AND ONE-TOUCH LISTENING WITH SINGLE NFC DEVICE BY REWIRING NFC TAG" filed on Feb. 27, 2015, which is incorporated herein by reference in its entirety.

TECHNICAL FIELD

This disclosure is related to a communication system including a portable terminal device which has a NFC tag, and an accessory apparatus which communicates with the portable terminal device.

DESCRIPTION OF RELATED ART

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near field communication (NFC) is a set of communication protocols that enables two electronic devices, such as a smartphone and a speaker, and the like to establish communication when the two electronic devices are within, for example 10 cm of each other.

SUMMARY

Aspects of the disclosure provide a device including a storage, a first communication circuit, and a controller. The device is a first device. The storage is configured to be re-writable. The first communication circuit is configured to perform first wireless communication with other devices and provide information stored at a specific memory space of the storage to the other devices when the other devices are within a first distance to the first device. The controller is configured to write first information in the specific memory space of the storage in response to a trigger operation of a user. The first information is transmitted to a second device by the first communication circuit when the second device is within the first distance to the first device for a first time. The controller is further configured to write second information in the specific memory space of the storage. The second information is transmitted by the first communication circuit to one or more other devices when the one or more other devices are within the first distance to the first device at following times.

In an embodiment, the first communication circuit is configured to perform the first wireless communication according to near field communication (NFC) technology. In an example, the first information is transmitted to the second device to cause a host application to be downloaded and installed on the second device. For example, the first information includes Android application record (AAR) information.

Further, in an embodiment, the device includes a second communication circuit configured to perform second wireless communication with another device when the first device and the other device are paired. In an example, the second information is transmitted to the other device by the first communication circuit to cause the other device to be paired with the first device to enable the second wireless communication. For example, the second information includes secure simple pairing information for Bluetooth based wireless communication.

Aspects of the disclosure provide a method for communication. The method includes writing first information in a specific memory space of a storage in a first device in response to a trigger operation of a user, transmitting, by a first wireless communication, the first information to a second device when the second device is within a first distance to the first device for a first time; writing second information in the specific memory space of the storage, and transmitting, by the first wireless communication, the second information to one or more other devices when the one or more other devices are within the first distance to the first device at following times.

Aspects of the disclosure provide a communication system including a first device and a second device. The first device includes a storage, a first communication circuit and a controller. The storage is configured to be re-writable. The first communication circuit is configured to perform first wireless communication with one or more other devices and provide information stored at a specific memory space of the storage to the other devices when the other devices are within a first distance to the first device. The controller is configured to write first information in the specific memory space of the storage in response to an initial trigger. The first information is transmitted to the second device by the first communication circuit when the second device is within the first distance to the first device for a first time. Further, the controller is configured to write second information in the specific memory space of the storage. The second information is transmitted by the first communication circuit to one or more other devices when the one or more other devices are within the first distance to the first device at following times.

BRIEF DESCRIPTION OF THE DRAWINGS

Various embodiments of this disclosure that are proposed as examples will be described in detail with reference to the following figures, wherein like numerals reference like elements, and wherein:

FIG. 1 shows a diagram of a communication system according to an embodiment of the disclosure;

FIG. 2 shows a diagram of an accessory apparatus according to an embodiment of the disclosure;

DETAILED DESCRIPTION OF EMBODIMENTS

Figure 3:
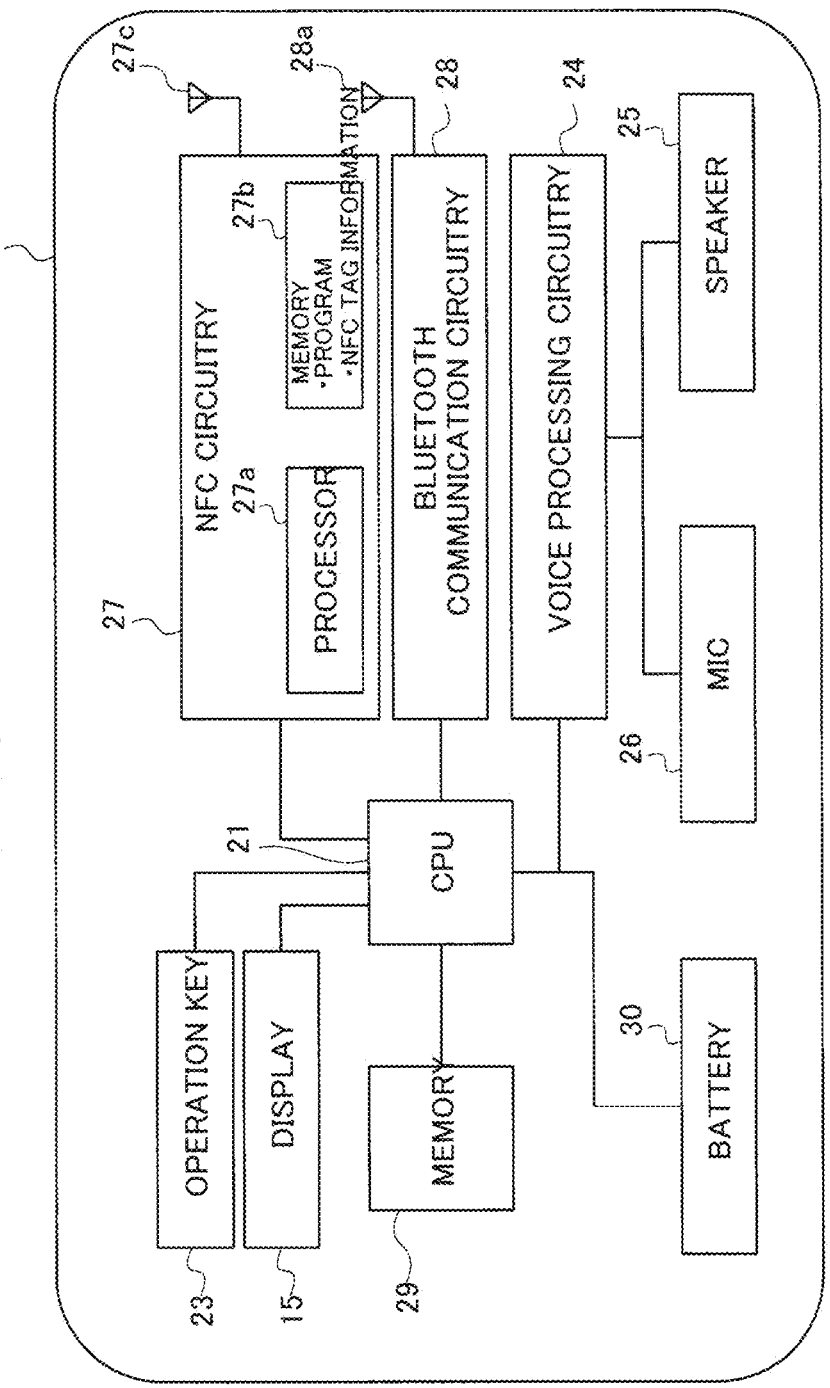
FIG. 3 shows a block diagram of an accessory apparatus according to an embodiment of the disclosure.

FIG. 1 shows a diagram of a communication system 1 according to an embodiment of the disclosure. The communication system 1 includes a terminal device 100, and an accessory apparatus 10. The accessory apparatus 10 can communicate with the terminal device 100 via wireless communication, and cooperate with the terminal device 100.

The terminal device 100 can be any suitable electronic device, such as a smartphone, a tablet computer, a laptop computer and the like. In the FIG. 1 example, the terminal device 100 is a smartphone having a display panel 120. Further, the terminal device 100 is configured to be near field communication (NFC) enabled. For example, the terminal device 100 includes hardware and software that support NFC technology.

NFC technology includes a set of protocols to enable data communication in a short distance, such as about 10 cm. According to an NFC technology, electromagnetic wave of about 13.56 MHz is used and 100-400 kbps interactive communication can be performed in a very close range of about 10 cm. Communication of NFC is possible when NFC-enabled apparatuses are held up closely in a range of about 10 cm.

The accessory apparatus 10 can be any suitable electronic device, such as a speaker, a printer, and the like. In the FIG. 1 example the accessory apparatus 10 is a speaker device that can operate according to instructions from the terminal device 100 for example.

In the FIG. 1 example, the accessory apparatus 10 has a case 11 with a bottom part 12. The case 11 can have any suitable shape. In the FIG. 1 example, the case 11 has a nearly spherical shape. Further, the case 11 is configured to allow a plurality of speakers to function. For example, the case 11 includes a plurality of speaker covers 13L-13R. Under each speaker cover of the accessory apparatus 10, a speaker can be suitably incorporated. In an example, when the speaker covers 13L-13R pop-up, the speakers can emit sound waves in the environment.

Further, in the FIG. 1 example, the accessory apparatus 10 is configured to have a surface portion 14 on the case 11. In an example, the surface portion 14 is configured to enable near field communication (NFC) technology. For example, NFC component, such as an NFC tag, an NFC antenna and the like, is suitably embedded under the surface portion 14, such that when the terminal device 100 is close to the surface portion 14, a distance between the NFC component embedded under the surface portion 14 and a NFC component in the terminal device 100 is within the short distance (e.g., 10 cm) for NFC based communication. In an example, when the terminal device 100 touches the surface portion 14, the distance between the NFC component embedded under the surface portion 14 and the NIFC component in the terminal device 100 is within, for example 10 cm. In another example, the terminal device 100 can be placed close to, but without touching, the surface portion 14 to enable near field communication between the NFC component embedded under the surface portion 14 and the NIFC component in the terminal device 100.

It is noted that while the following description uses touching the surface portion 14 as an example to place NFC components in a short range for NFC based communication, the present disclosure is riot limited to the touching of the surface portion 14.

According to an aspect of the disclosure, the NFC component in the accessory apparatus 10 is configured to provide different information to the terminal device 100 under different scenarios. In an embodiment, the NFC component in the accessory apparatus 10 is configured to provide first information to the terminal device 100 to support one-touch initial setup under an initial setup scenario, and provide second information to support one-touch Bluetooth communication under a music playing scenario (normal operation scenario). In an example, the accessory apparatus 10 is configured to write first information in a memory space of a storage of the NFC component at an initial time. The first information is transmitted to the terminal device 100 to cause one-touch initial setup in the terminal device 100 when the terminal device 100 touches the surface portion 14 for a first time. Then, in the example, the accessory apparatus 10 writes second information in the storage of the NFC component. Thus, the second information can be transmitted to the terminal device 100 and other terminal devices (e.g. other smart phones) to cause one-touch wireless communication for music playing when the terminal device 100 and the other terminal devices touch the surface portion 14 at following times. In the example, one NFC component is used in the accessory apparatus 10 to enable multiple usages.

It is noted that the one-touch wireless communication can be any suitable wireless communication, such as Bluetooth communication, a wireless LAN communication, industry-science-medial (ISM) band wireless communication, ECHONET Lite wireless communication, ZigBee based on IEEE 802.15.4 wireless communication, Z-Wave wireless communication, and the like.

In a related example, multiple NFC tags, such as a first NFC tag and a second NFC tag (NFC chips), and the like are used in an accessory apparatus for multiple usages. Each of the NFC tags has a respective usage. For example, the first NFC tag of the accessory apparatus is used at an initial time when a srnartphone is held closely to the accessory apparatus. The first NFC tag causes the smartphone to start downloading a smartphone application on the smartphone. In an example, the smartphone is an Android based smartphone. Android is the software execution environment (OS: Operating System). The first NFC tag is configured to hold first information that includes Android application record (AAR) type NFC tag information. Then, the first NFC tag provides the first information to an Android based smartphone to cause the Android based smartphone to download and setup a smartphone application.

Further, in the related example, the second NFC tag is configured to hold second information that includes secure simple pairing (SSP) type NFC tag information for Bluetooth communication. The second NFC tag provides the second information to one or more Bluetooth apparatuses, such as an owner's smartphone, a friend's smartphone, and the like, to enable a connection for music playing with a single touch.

In the related example, the first NFC tag and the second NFC tag are physically arranged in the accessory apparatus, and the minimum size of the accessory apparatus can be limited due to a space limitation to separate the two NFC tags.

According to an aspect of the disclosure, the accessory apparatus 10 uses one NFC component for multiple usages and thus can be implemented with a relatively smaller size compared to the accessory apparatus in the related example.

FIG. 2 shows a diagram for the bottom part 12 of the case 11 in the accessory apparatus 10 according to an embodiment of the disclosure. The bottom part 12 is configured to have a switch 16 that can be slid to one of three positions. The three positions are an 'OFF' position, an 'ON' position and a 'Pairing' position. The 'ON' position is in the middle of the 'OFF' position and the 'Pairing' position. In an example, the 'ON' position and the 'OFF' position are positions on which the switch 16 can stay without being held by a user. The 'Pairing' position is a position that requires a user to hold the switch 16.

The switch 16 can be slid to stay at the position 'ON' and the position 'OFF'. From the position 'ON', the switch 16 can be further slid to the position 'Pairing'. Without being held, the switch 16 can return from the 'Pairing' position back to the 'ON' position.

When the switch 16 is at the position 'OFF', the accessory apparatus 10 is powered off. When the switch 16 is slid from the position 'OFF' to the position 'ON', the accessory apparatus 10 is powered on.

In an example, the accessory apparatus 10 uses battery to provide power. When the switch 16 is at the position 'OFF', the power supply from the battery of the accessory apparatus 10 to a control system is cut off (power-OFF). When the switch 16 is at the position 'ON', electrical power is supplied to the control system of the accessory apparatus 10 from the battery (power-ON).

Moreover, when the switch 16 is slid and held to the position 'Pairing' for more than 2 second, the accessory apparatus 10 starts a pairing process with another apparatus.

FIG. 3 shows a block diagram of an internal structure of the accessory apparatus 10 according to an embodiment of the disclosure. The accessory apparatus 10 includes various components, such as a central processing unit (CPU) 21, a memory 29, a display portion 15, operation key circuitry 23, voice processing circuitry 24, a speaker component 25, a microphone component 26, NFC circuitry 27, Bluetooth communication circuitry 28, and the like coupled together as shown in FIG. 3.

The memory 29 can store various information, such as software instructions to be executed by the CPU 21, data generated during execution, user specified data, and the like.

The CPU 21 of the accessory apparatus 10 is coupled to the other components directly or via a suitable interconnection technique (e.g., a bus). The CPU 21 can receive signals from the other component and can provide control signals to control the other components in the accessory apparatus 10. In an example, the CPU 21 reads software instructions stored by the memory 29, executes the software instructions and controls the other components of the accessory apparatus 10 according to the software instructions.

It is noted that, in an example, a micro-processing unit (MPU) can be used in the place of the CPU 21.

The display portion 15 includes a suitable display panel and circuitry configured to present images and other suitable information to on the display panel under the control of the CPU 21. The display panel can be any suitable display panel, such as a liquid crystal display panel, and the like.

The operation key circuitry 23 is configured to generate control signals in response to user operations on operation keys, and provide the control signals to the CPU 21. The operation keys can be any suitable keys on which a user can operate. For example, the switch 16 is an operation key. The accessory apparatus 10 can include other suitable operation keys.

The voice processing circuitry 24 is a codec for sound signals. In an example, the voice processing circuitry 24 converts an analog signal of sound into digital data of sound, or converts digital data of sound into an analog signal of sound. For example, the voice processing circuitry 24 can perform encoding and/or decoding of digital data. In an example, the voice processing circuitry 24 receives digital data from the CPU 21, performs a demodulation process of the digital data, and converts the demodulated data to an analog sound signal. The analog sound signal obtained by the voice processing circuitry 24 can be provided to the speaker component 25. The speaker component 25 includes one or more speakers and is configured to generate sound waves in the air in response to the analog sound signal.

In another example, the microphone component 26 is configured to generate an analog sound signal in response to sound waves in the air. The voice processing circuitry 24 encodes the analog sound signal to generate digital data corresponding to the analog sound signal. The digital data can be provided to the CPU 21 for further processing.

The NFC circuitry 27 (first communication circuitry) is configured to perform data communication with another NFC enabled apparatus according to a NFC technology (e.g., NFC specifications in ISO/IEC 18092) when the other NFC enabled apparatus, such as the terminal device 100 and the like, and the accessory apparatus 10 are within a distance of about 10 cm. In an example, the NFC circuitry 27 is implemented using a NFC tag, a NFC chip, and the like.

In the FIG. 3 example, the NFC circuitry 27 includes a processor 27a and a memory 27b. The processor 27a is configured to perform arithmetic processing. In an example, the memory 27b includes non-volatile semiconductor memories that are re-writable. The memory 27a stores, for example, instruction codes to be executed by the processor 27a, NFC tag information, and the like. The processor 27a can read from and/or write to the memory 27b. In an example, a memory space in the memory 27b is allocated to store the NFC tag information. The processor 27a can perform a read access to the memory space to extract the stored NFC tag information, and can perform a write access to write NFC tag information in the memory space.

According to an aspect of the disclosure, the NFC tag information includes records in a suitable data exchange format, such as NFC Data Exchange Format (NDEF). The NFC tag information can be suitably transmitted in a message. The NFC tag information can be suitably modified based on scenarios for multiple usages. In an example, the NFC tag information can include Android application record (AAR) information. AAR is a special type of NDEF record, and can be written in the memory space as the NFC tag information. The AAR can be used to indicate a specific Android application. For example, URL (Uniform Resource Locator) information for a web page to download the specific application is included in the AAR.

In another example, the NFC tag information can be used for out of band Bluetooth pairing. For example, the secure simple pairing (SSP) information for Bluetooth pairing can be suitably written in the memory space as the NFC tag information. The SSP information can include information needed for performing pairing of Bluetooth apparatuses using out of band pairing, such as NFC, etc. For example, the SSP can include the Bluetooth address of the accessory apparatus 10, a simple pairing hash value, a simple pairing randomizer value, and the like. In an example, the NFC tag can be used to provide Bluetooth address and other optional parameters related to specific Bluetooth enabled device, such that a need of inquiring process to inquire the parameters can be eliminated and the Bluetooth discovery process is simplified.

The NFC circuitry 27 is coupled to an antenna 27c configured for data communication according to the NFC technology. In an example, the antenna 27c is implemented using coil in planar shape.

In an example, the antenna 27c generates electrical signal in response to electromagnetic waves in the air. The electrical signal is provided to the processor 27a to extract information carried in the electromagnetic waves. On the other hand, the processor 27a can generate electrical signal that carries information for transmission. Then the antenna 27c emits electromagnetic waves corresponding to the electrical signal.

According to an aspect of the disclosure, functions of the accessory apparatus 10 can be controlled using a host application. In an example, in addition to the music reproduction function, the accessory apparatus 10 can be equipped with other functions, such as an alarm clock function, and the like. In the example, when the terminal device 100 is installed with the host application, the terminal device 100 can control the various functions of the accessory apparatus 10 via the host application.

According to an aspect of the disclosure, the processor 27a executes software instructions stored in the memory 27b to write AAR or SSP type NFC tag information into the memory space within the memory 27b that is allocated for the NFC tag information. Thus, the NFC tag information at the memory space in the memory 27b can be changed under different scenarios. The detail process of rewriting the NFC tag information will be described later with reference to FIG. 5.

In an example, the NFC circuitry 27 is implemented on an integrated circuit (IC) chip. In another example, the NFC circuitry 27 is implemented using a processor chip and a memory chip.

In the FIG. 3 example, the Bluetooth communication circuitry 28 is coupled with an antenna 28a. In an example, the Bluetooth communication circuitry 28 is implemented using a chip set. The Bluetooth communication circuitry 28 performs a data communication with another Bluetooth enabled apparatus (e.g., the terminal device 100) when the other Bluetooth enabled apparatus is within a range of about tens of meters via the antenna 28a based on Bluetooth technology, such as described in IEEE 802.15.1.

The battery 30 is configured to store electric power and provide electric power to other components of the accessory apparatus 10. In an example, the battery 30 is rechargeable and can be recharged from a power source, such as a wall outlet, and the like. It is noted that the accessory apparatus 10 can include other suitable power module, such as another battery pack, an AC-to-DC power module, a DC power module, and the like.

Figure 4:
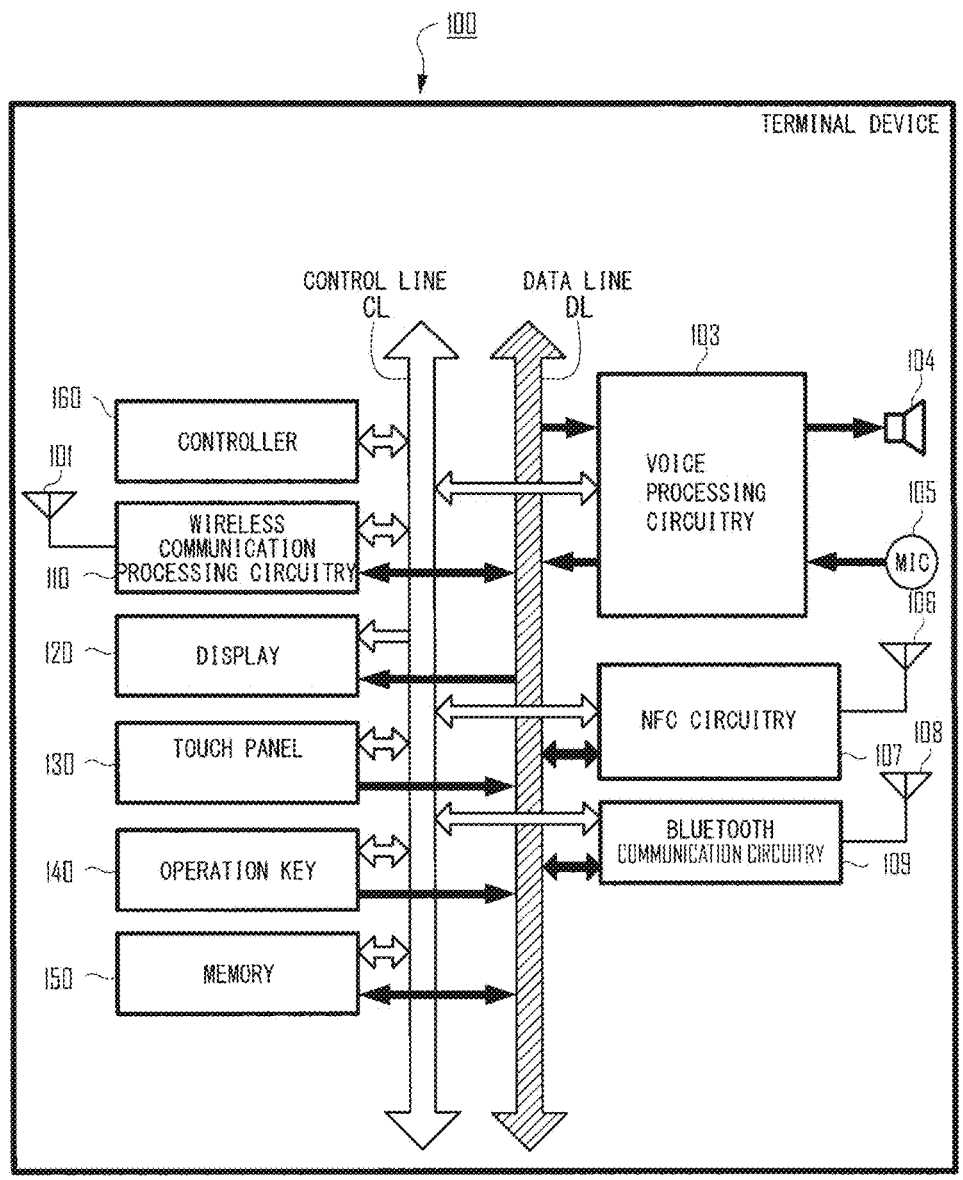
FIG. 4 shows a block diagram of a terminal device according to an embodiment of the disclosure.

FIG. 4 shows an exemplary block diagram of the terminal device 100 according to an embodiment of the disclosure. The terminal device 100 includes various components, such as a wireless communication processing circuitry 110, a controller 160, a memory 150, operation key circuitry 140, touch panel 130, display panel 120, voice processing circuitry 103, NFC circuitry 107, and Bluetooth communication circuitry 109 coupled together as shown in FIG. 4. In the FIG. 4 example, the components are coupled together using bus architecture, such as a control line CL bus and a data line DL bus. It is noted that the components can be coupled together using other suitable technology.

In the FIG. 4 example, the wireless communication processing circuitry 110 is coupled with an antenna 101 to perform cellular based wireless communication. For example, the wireless communication processing circuitry 110 is coupled with the antenna 101 to receive radio signals from one or more base stations, and transmit radio signals to the one or more base stations.

The controller 160 is configured to control the operations of the terminal device 100. In an example, the controller 160 is implemented using a central processing unit (CPU) or a micro processing unit (MPU) that executes software instructions. For example, the controller 160 reads software instructions stored in the memory 150 through the control line CL bus, executes the software instructions, generates control signals, and transmits the control signals to other components via the control line CL bus. In another example, the controller 160 can receive detection signals from the other components. For example, the touch panel 130 generates finger detection signals in response to finger operations on a touch screen, and provides the finger detections signals to the controller 160. The controller 160 then generates the control signals based on the signal detection signals.

The memory 150 is configured to store various data, such as software instructions to be executed, data that is generated by user operations, and the like. In an example, the controller 160 can control memory access to the memory 150. For example, the controller 160 can control data write to the memory 150 and can control data read from the memory 150.

The voice processing circuitry 103 is configured for sound signal processing. The voice processing circuitry 103 is codec for sound signals. In an example, the voice processing circuitry 103 converts an analog signal of sound into digital data of sound, or converts digital data of sound into an analog signal of sound. For example, the wireless communication processing circuitry 110 generates digital data in response to radio signal for a telephone call, and provide the digital data to the voice processing circuitry 103 via the data line DL bus. The voice processing circuitry 103 receives the digital data, demodulates the digital data and converts the digital data to an analog sound signal. The analog sound signal obtained by the voice processing circuitry 103 can be provided to a speaker component 104. The speaker component 104 includes one or more speakers and is configured to generate sound waves in the air in response to the analog sound signal.

In another example, a microphone component 105 is configured to generate an analog sound signal in response to sound waves in the air. The voice processing circuitry 103 encodes the analog sound signal to generate digital data corresponding to the analog sound signal. The digital data can be provided to the wireless communication circuitry 110. The wireless communication circuitry 110 can packet the digital data, and transmit radio signals via the antenna 101 to carry the digital data.

It is noted that, in an example, the terminal device 100 does not have the voice call function and may not have the voice processing circuitry 103, the speaker component 104 or the microphone component 105.

In an embodiment, the terminal device 100 transmits/receives the data via networks, such as Internet, and the like. The wireless communication processing circuitry 110 performs the process of transmission or reception under control of the controller 160. For example, the wireless communication circuitry 110 receives data for network applications, and stores the data in the memory 150 under the control of the controller 160. The controller 160 controls the display panel 120 to present the data to a user via a graphic user interface on a display screen. The controller 160 can also control the wireless communication processing circuitry 110 to transmit radio signals to carry data stored in the memory 150.

The display panel 120 includes a panel and circuitry, and is configured to present images or a variety of information under the control of the controller 160. The display panel 120 can be any suitable display panel, such as a liquid crystal display panel, an organic electro-luminescence (EL) display panel and the like.

The touch panel 130 is configured to generate touch detection signals in response to touches on a panel. For example, when an object, such as a finger, pen, and the like, touches a position on the panel, the touch panel 130 generates a detection signal (e.g., digital data) that is indicative of the touch position. The detection signal that is indicative of the touch position is transmitted to the controller 160. Based on the touch position, the controller 160 activates applications in an example. In an example, a touch position is expressed as a coordinate position of a X-axis (horizontal axis) and a Y-axis (vertical axis) which are two axes orthogonally crossed, for example.

In an example, the touch panel 130 is laminated or integrated with the display panel 120, such that the display panel 120 can display images and can sense touches.

The terminal device 100 includes one or more operation keys, such as volume keys, home key, power key, and the like. The operation key circuitry 140 is configured to generate key signals in response to actions on the operation keys. The key signals can be transmitted to the controller 160. The controller 160 can control the operations of the terminal device 100 based on the key signals.

The NFC circuitry 107 is coupled with an antenna 106. In an example, the antenna 106 is similarly configured to as the antenna 27c and the NFC circuitry 107 is similarly configured as the NFC circuitry 27 to perform data communication with another NFC enabled apparatus according to a NFC technology (e.g., NFC specifications in ISO/IEC 18092) when the other NFC enabled apparatus, such as the accessory apparatus 10 and the like, is within 10 cm of the terminal device 10. In an example, the NFC circuitry 107 is implemented using a NFC tag, a NFC chip, and the like.

The Bluetooth communication circuitry 109 is coupled to an antenna 108. The Bluetooth communication circuitry 109 is similarly configured as the Bluetooth communication circuitry 28 of the accessory apparatus 10. The Bluetooth communication circuitry 109 performs data communication with another Bluetooth enabled apparatus (e.g., the accessory apparatus 10) when the other Bluetooth enabled apparatus exists in the range about tens of meter based on Bluetooth specification.

It is noted that the terminal device 100 can include other suitable components not shown), such as a camera, an image processing circuitry, a power supply component, a battery pack, and the like.

Figure 5:
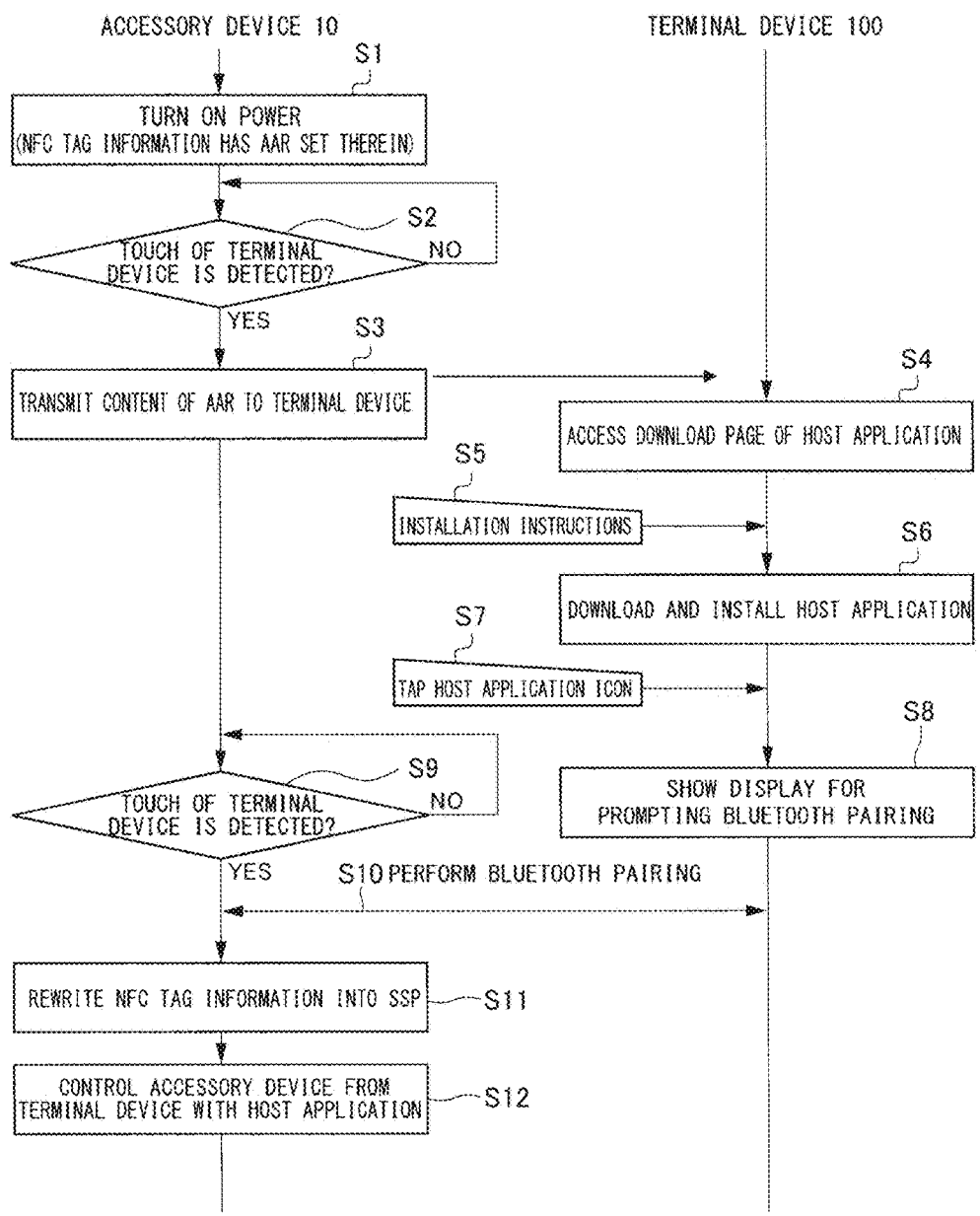
FIG. 5 shows a flow chart outlining a process example according to an embodiment of the disclosure.

FIG. 5 shows a flow chart outlining a process example according to an embodiment of the disclosure. In an example, the process is performed by the terminal device 100 and the accessory apparatus 10 in the wireless communication system 1 to allow NFC tag information for an NFC tag to be changed, such that the NFC tag can be used differently in different scenarios. For example, the same NFC tag is configured to enable one-touch setup of a host application, and then configured to enable one-touch Bluetooth pairing for music playing.

Figure 6:
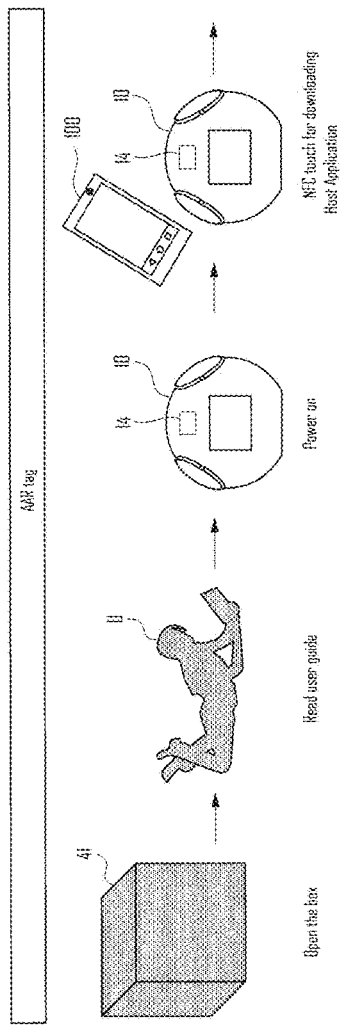
FIG. 6 shows a process for using an accessory apparatus in a communication system according to an embodiment of the disclosure.
Figure 7:
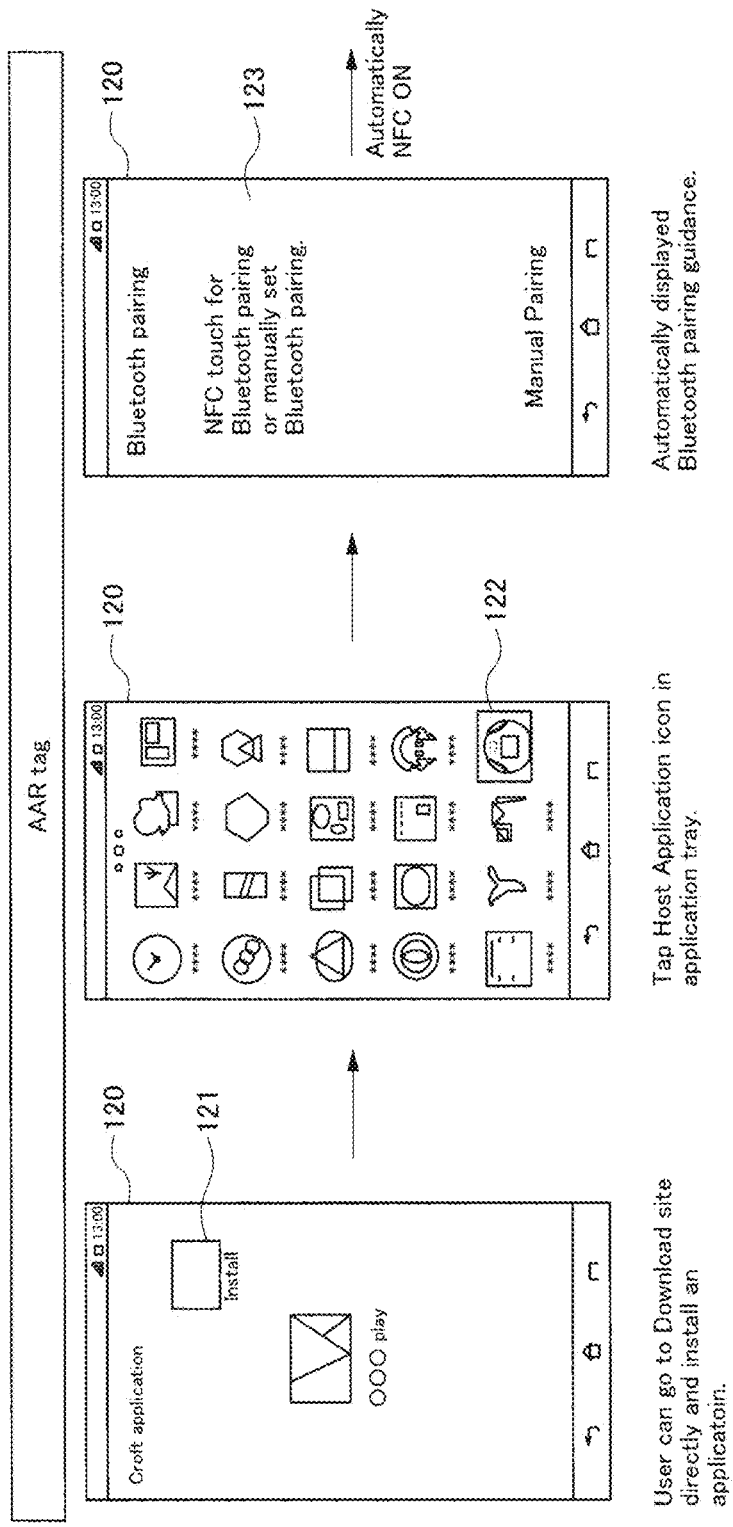
FIG. 7 shows a process for using a terminal device in a communication system according to an embodiment of the disclosure.
Figure 8:
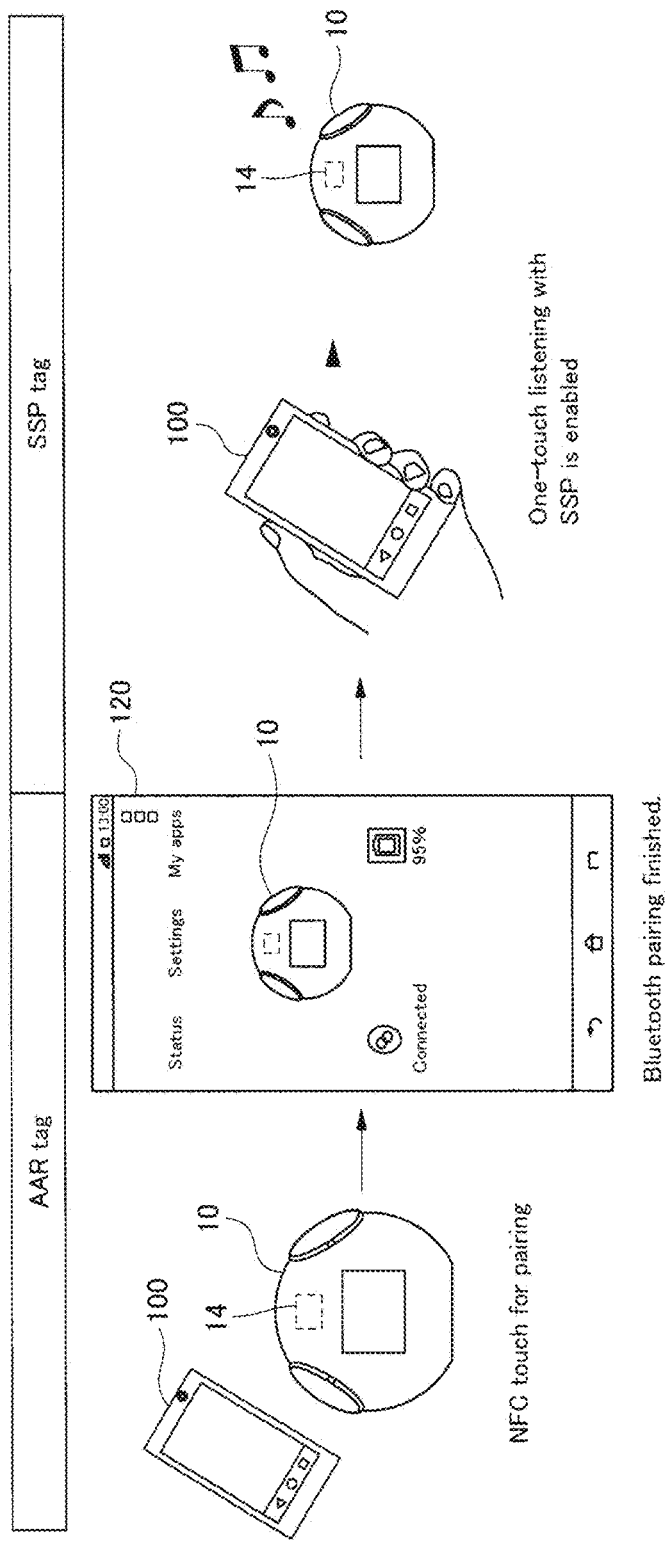
FIG. 8 shows a communication process according to an embodiment of the disclosure.
Figure 9:
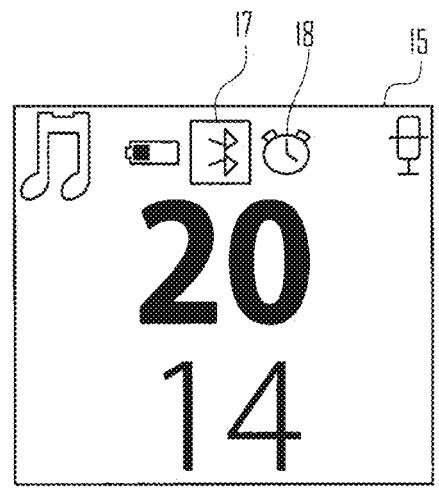
FIG. 9 shows a user interface example according to an embodiment of the disclosure.

FIGS. 6-8 show state transitions in the wireless communication system 1 during the process. In an example, the processor 27a executes software instructions stored in the memory 27b, the CPU 21 executes software instructions stored in the memory 29 and the controller 160 executes software instructions stored in the memory 150 during the process. FIG. 9 shows a user interface example.

In the FIG. 5 example, the process starts from power-on of the accessory apparatus 10. It is noted that, the process can be suitably modified for another scenario.

Step S1: a user U who purchased the accessory apparatus 10 opens a box 41 (FIG. 6) which accommodated the accessory apparatus 10. The user U can take out the accessory apparatus 10 from the box 41, and reads an instruction manual. The user U can slide the switch 16 of the accessory apparatus 10 to the position 'ON'.

When the switch 16 is slid to the position 'ON', a power supply is provided to components of the accessory apparatus 10, and the accessory apparatus 10 is powered on. At the power-on scenario, in an example, AAR information is written in a memory space in the memory 275. The memory space is allocated for NFC tag information, thus the NFC tag 27 has the AAR type NFC tag information at the time of power-on.

In addition, in an example, at a time of factory shipments, SSP information may be written in the memory space in the memory 27b as NFC tag information in advance, thus the power-on of the accessory apparatus 10 triggers an operation to write the AAR based NFC tag information and replace the SSP based NFC tag information with the AAR based NFC tag information.

Step S2: the processor 27a of the NFC section 27 determines whether the terminal device 100 touches the NFC touch surface 14 of the accessory apparatus 10. In an example, when the terminal device 100 is within, for example 10 cm of the accessory apparatus 10, the antenna 27a can generate electrical signals in response to radio signals emitted by the terminal device 100, thus the NFC circuitry 27 can sense the existence of the terminal device 100, and the processor 27a determines that the terminal device 100 touches the NFC touch surface 14, the process proceeds to step S3; otherwise, the process returns to step S2.

It is noted that a touch includes the situation in which the terminal device 100 directly-contacts to the NFC touch surface 14, and the situation when the terminal device 100 enters in the predetermined distance (e.g., 10 cm) of the NFC touch surface 14.

Step S3: the processor 27a transmits the NFC tag information in the memory 27b to the terminal device 100 via the antenna 27c. At the time, the NFC tag information is AAR based NFC tag information. The AAR includes the information for accessing a download page (URL information) of a host application.

Step S4: the NFC circuitry 107 of the terminal device 100 receives the AAR based NFC tag information via the antenna 106, and sends the AAR information to the controller 160. The controller 160 controls the terminal device 100 to access the download page of the host application based on the URL information in the AAR. In an example, the controller 160 controls the wireless communication circuitry 110 to access the Internet for the download page. The controller 160 can control the terminal device 100 to display a downloading screen (FIG. 7) on the display panel 120.

It is noted that in a case that the host application has been previously downloaded in the terminal device 100, the controller 160 can detect that the host application has been installed, and control the terminal device 100 to signal the user U on the display panel 120.

Step S5: the user U operates on the touch panel 130 to instruct an installation of the host application. For example, the user U taps on an installation icon 121 (FIG. 7) on display panel 120 and instructs an installation of the host application to the terminal device 100.

Step S6: the controller 160 controls the components of the terminal device 100 to download the host application and install the host application on the terminal device 100. For example, the controller 160 can control the wireless communication circuitry 110 to communicate with the provider of the host application via the Internet to download the host application. Further, the controller 160 installs the the host application on the terminal device 100. After the installation, the terminal device 100 can display a host application icon 122 (FIG. 7) on the application tray screen of the display panel 120.

Step S7: the user U taps the host application icon inn in the application tray screen on the display panel 120, The controller 160 waits for a detection signal from the touch panel 130. When the detection signal that is indicative of a tap on the host application icon 122 is received by the controller 160, the controller 160 can start the host application.

Step S8: the controller 160 controls the terminal device 100 to display a guidance screen 123 (FIG. 7) on the display panel 120. The guidance screen 123 urges Bluetooth pairing, For example, in the guidance screen 123, a message, such as "NFC touch for Bluetooth paring or manually set Bluetooth pairing" and the like, can be displayed.

Step S9: the processor 27a of the NFC section 27 determines whether the terminal device 100 touches the NFC touch surface 14 of the accessory apparatus 10. In an example, when the terminal device 100 is within, for example 10 cm of the accessory apparatus 10, the antenna 27a can generate electrical signals in response to radio signals emitted by the terminal device 100, thus the NFC circuitry 27 can sense the existence of the terminal device 100, and the processor 27a determines that the terminal device 100 touches the NFC touch surface 14, the process proceeds to step S10; otherwise, the process returns to step S9.

Step S10: the NFC circuitry 27 of the accessory apparatus 10 and the NFC circuitry 107 of the terminal device 100 mutually transmit Bluetooth addresses, thus a Bluetooth pairing process can be performed based on the Bluetooth addresses that are transmitted over NFC channel. For example, the NFC circuitry 27 transmits Bluetooth address of the accessory apparatus 10 to the terminal device 100, and the NFC circuitry 107 receives the Bluetooth address of the accessory apparatus 10; and the NFC circuitry 107 transmits Bluetooth address of the terminal device 100 to the accessory apparatus 10, and the NFC circuitry 27 receives the Bluetooth address of the terminal device 100. Then, in an embodiment, the Bluetooth communication circuitry 28 and the Bluetooth communication circuitry 109 can operate based on the received Bluetooth address to perform a suitable Bluetooth pairing process. The Bluetooth pairing process can determine certain pairing parameters. In an example, the Bluetooth pairing process determines parameters for secure simple pairing (SSP), such as simple pairing hash information, simple pairing randomizer information, and the like.

Step S11: when the Bluetooth pairing process is completed, and the parameters for the secure simple pairing are determined, the processor 27a of the NFC circuitry 27 of the accessory apparatus 10 re-writes the NFC tag information in the memory 27b from AAR type of NFC tag information to SSP type of NFC tag information. At this time, in an example, the controller 160 of the terminal device 100 can control the display panel 120 to display a message showing that the Bluetooth pairing process is completed.

In addition, in an example, the CPU 21 in the accessory apparatus 10 can control the display portion 15 to display a Bluetooth icon 17 (FIG. 9) when the Bluetooth pairing process is completed.

Thus, when Bluetooth pairing is completed, NFC tag information in the accessory apparatus 10 changes to SSP type NFC tag information, both the accessory apparatus 10 and terminal device 100 change the display content on respective display parts.

When the display content of the display part of each apparatus changes according to the state of each apparatus, the user U is enabled to recognize the state of each apparatus, and the usability of each apparatus improves.

Step S12: after the Bluetooth pairing process in the step S10, the terminal device 100 and the accessory apparatus 10 are connected via Bluetooth wireless communication.

The user U can use the terminal device 100 to execute the host application and can use the host application to control the accessory apparatus 10. For example, when the host application of the terminal device 100 has a music reproduction operation function, the user U can act on the play button of the host application, and can make the accessory apparatus 10 to play a desired music. Further, when the host application has an alarm clock function, the user U can operate on host application and can set an alarm to the accessory apparatus 10. For example, in the display part 15 of FIG. 9, alarm clock icon 18 which shows that the alarm clock function is set to ON is displayed.

It is noted that the SSP based NFC tag information in the NFC circuitry 27 can be used to simply further Bluetooth pairing with the terminal device 100 and/or other suitable terminal device.

According to an aspect of the disclosure, when the NFC tag information in the memory 27b is the SSP type of NFC tag information, the accessory apparatus 10 enters a normal operation mode. In the normal operation mode, when a terminal device, such as the terminal device 100, a terminal device belonging to a friend of user U, and the like touches the NFC touch surface 14 of the accessory apparatus 10, the NFC circuitry 27 can sense the existence of the terminal device, and the processor 27a transmits the SSP type of NFC tag information to the terminal device via the antenna 27c. Then, the terminal device can pair with the accessory apparatus 10 for Bluetooth communication.

Figure 10:
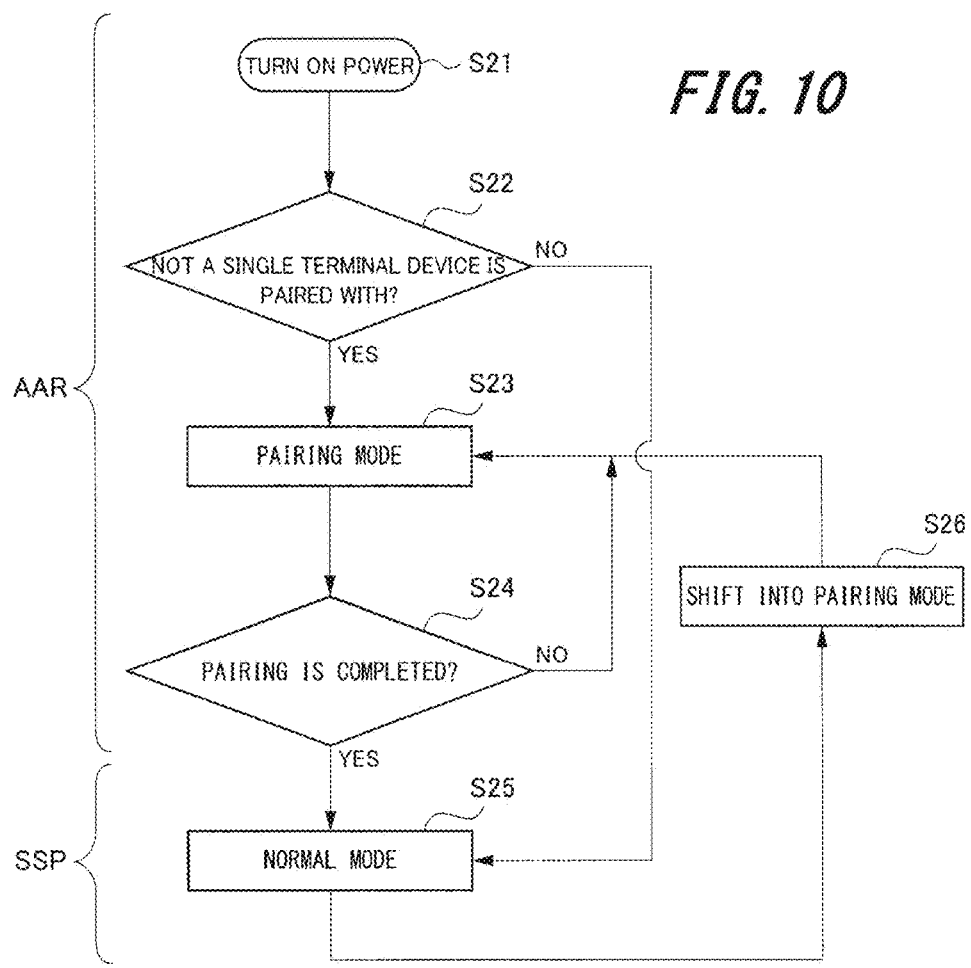
FIG. 10 shows a process example according to an embodiment of the disclosure.

FIG. 10 shows a process example to switch the NFC tag information in the NFC circuitry 27 of the accessory apparatus 10 between the AAR type of NFC tag information and SSP type NFC tag information according to an embodiment of the disclosure.

Step S21: the user U slides the switch 16 of the accessory apparatus 10, and turns ON the power supply of the accessory apparatus 10. Then, the AAR based NFC tag information is written in the memory space allocated for storing the NFC tag information in the memory 27b of the NFC circuitry 27. Thus, the NFC tag information for the NFC circuitry 27 in AAR based NFC tag information.

Step S22: the processor 27a of the NFC circuitry 27 of the accessory apparatus 10 determines whether Bluetooth pairing is carried out to any one of other apparatuses including the terminal device 100. In an example, the memory 27b (or memory 29) of the accessory apparatus 10 can store Bluetooth pairing information with a plurality of other apparatuses, such as a maximum of 5 other apparatuses is recorded. Based on the stored Bluetooth pairing information, the processor 27a can make the determination. When the processor 27a determines that Bluetooth pairing is completed with at least one of the other apparatuses, the process proceeds to S25; otherwise the process proceeds to S23.

Step S23: the NFC circuitry 27 enters a pairing mode. In the pairing mode, when an apparatus, for example the terminal device 100, touches the NFC touch surface 14, the touch is detected, the processor 27a of the NFC circuitry 27 can perform a pairing process with the terminal device 100. In an example, the processor 27a of the NFC circuitry 27 can perform the pairing process with the terminal device 100 via the NFC channel. The pairing process exchanges information for Bluetooth pairing, such Bluetooth address and other optional parameters.

Step S24: the processor 27a of the NFC circuitry 27 determines whether the Bluetooth pairing with the terminal device 100 is completed. When the Bluetooth pairing is not completed, the process returns to step S23, and continues the pairing process or waits.

Step S25: the processor 27a of the NFC circuitry 27 replaces the AAR based NFC tau information with SSP based NFC tag information in the memory 27b, then the NFC circuitry 27 enters a normal operation mode. In the normal operation mode, when a terminal device, such as the terminal device 100, a terminal device belonging to a friend of user U, and the like touches the NFC touch surface 14 of the accessory apparatus 10, the NFC circuitry 27 can sense the existence of the terminal device and the processor 27a transmits the SSP type of NFC tag information to the terminal device via the antenna 27c. Then, the terminal device can pair with the accessory apparatus 10 for Bluetooth communication.

Step S26: in the normal operation mode, in an example, when the switch 16 of the accessory apparatus 10 is slid to 'Pairing' about 2 second, the status change of the switch 16 is detected, and the processor 27a of the NFC circuitry 27 replaces the SSP based NFC tag information with the AAR based NFC tag information, and the NFC circuitry 27 enters the pairing mode. The process returns to S23.

This disclosure performs the negotiation tor establishing communication in a wireless communication system between the accessory apparatus 10 and the terminal device 100 using NFC channel. The wireless communication system can be any suitable wireless communication system, such as Bluetooth communication system, a wireless LAN communication system, industry-science-medial band wireless communication system, ECHONET Lite communication system, ZigBee based on IEEE 802.15.4 communication system, Z-Wave communication system, and the like.

It is noted that other suitable NFC tag information beside the AAR, based NFC tag information and the SSP based NFC tag information can be used in an example.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A first device comprising:
   a storage configured to be re-writable, storing a first type of near field communication (NFC) tag information as initially set at a time of factory shipments;
   a first communication circuit configured to:
   perform first wireless communication with other device when the other device is within a first distanceto the first device; and
   provide information stored at the storage to the other device; and
   a controller configured to:
   replace the first type of NFC tag information with a second type of NFC tag information in the storage upon turning on the first device by a user, the second type of NFC tag information being transmitted to a second device by the first communication circuit when the second device is within the first distance to the first device for a first time;
   cause the second device, based on the second type of NFC tag information transmitted, to access a download page; and
   re-write from the second type of NFC tag information to the first type of NFC tag information in the storage when a pairing process between the first device and the second device is completed, the re-written first type of NFC tag information being transmitted by the first communication circuit to one or more other devices when the one or more other devices are within the first distance to the first device at following times.

2. The first device of claim 1, wherein the first communication circuit is configured to perform the first wireless communication according to near field communication (NFC) technology.

3. The first device of claim , wherein the second type of NFC tag information is transmitted to the second device to cause a host application to he downloaded and installed on the second device.

4. The first device of claim 3, wherein the second type of NFC tag information includes Android application record (AAR) information.

5. The first device of claim 3, further comprising:
   a second communication circuit configured to perform a second wireless communication with another device when the first device and the other device are paired.

6. The first device of claim 5, wherein the re-written first type of NFC tag information is transmitted to the other device by the first communication circuit to cause the other device to he paired with the first device to enable the second wireless communication.

7. The first device of claim 6, wherein the re-written first type of NFC tag information includes secure simple pairing information for Bluetooth based wireless communication.

8. A method for communication, comprising:
   storing, in a storage of a first device, a first type field communication (NFC) tag information as initially set at a time of factory shipments;
   replacing the first type of NFC tag information with a second type of NFC tag information in the storage upon turning on the first device by a user;
   transmitting, by a first wireless communication, the second type of NFC tag information to a second device when the second device is within a first distance to the first device for a first time;

causing the second device, based on the second type of NFC tag information transmitted, to access a download page;

re-writing from the second type of NFC tag information to the first type of NFC tag information in the storage when a pairing process between the first device and the second device is completed;

transmitting, by the first wireless communication, the re-written first type of NFC tag information to one or more other devices when the one or more other devices are within the first distance to the first device at following times.

9. The method of claim 8, wherein the first wireless communication is based on near field communication (NFC) technology.

10. The method of claim 8, wherein the second type of NFC tag information is transmitted to the second device to cause a host application to be downloaded and installed on the second device.

11. The method of claim 10, wherein the second type of NFC tag information includes Android application record (AAR) information.

12. The method of claim 10, wherein transmitting, by the first wireless communication, the re-written first type of NFC tag information to one or more other devices when the one or more other devices are within the first distance to the first device at following times further comprises:

transmitting, by the first wireless communication, the re-written first type of NFC tag information to the one or more other devices to cause the one or more other devices to be paired with the first device to enable a second wireless communication.

13. The method of claim 12, wherein the second wireless communication is based on Bluetooth technology.

14. The method of claim 13, wherein the re-written first type of NFC tag information includes secure simple pairing information for Bluetooth based wireless communication.

15. A communication system comprising a first device and a second device, the first device comprising:
a storage configured to be re-writable, storing a first type of near field communication (NFC) tag information as initially set at a time of factory shipments;
a first communication circuit configured to perform first wireless communication with other devices and provide information stored at the storage to the other devices when the other devices are within a first distance to the first device; and
a controller configured to
replace the first type of NFC tag information with a second type of NFC tag information in the storage upon turning on the first device by a user, the second type of NFC tag information being transmitted to the second device by the first communication circuit when the second device is within the first distance to the first device for a first time;
cause the second device, based on the second type of NFC tag information transmitted, to access a download page; and
re-write from the second type of NFC tag information to the first type of NFC tag information in the storage when a pairing process between the first device and the second device is completed, the re-written first type of NFC tag information being transmitted by the first communication circuit to one or more other devices when the one or more other devices are within the first distance to the first device at following times.

16. The communication system of claim 15, wherein the first communication circuit is configured to perform the first wireless communication according to near field communication (NFC) technology.

17. The communication system of claim 15, wherein the second type of NFC tag information is transmitted to the second device to cause a host application to be downloaded and installed on the second device.

18. The communication system of claim 17, wherein the second type of NFC tag information includes Android application record (AAR) information.

19. The communication system of claim 17, wherein the first device further comprises a second communication circuit configured to perform a second wireless communication with another device when the first device and the other device are paired.

20. The communication system of claim 19, wherein the re-written first type of NFC tag information includes secure simple pairing information for Bluetooth technology, and is transmitted to the other device by the first communication circuit to cause the other device to be paired with the first device to enable the second communication circuit to perform Bluetooth based wireless communication.

* * * * *